(12) United States Patent
Celik et al.

(10) Patent No.: US 12,215,292 B2
(45) Date of Patent: *Feb. 4, 2025

(54) CATALYTIC UPCYCLING OF POLYOLEFINS INTO LUBRICANTS

(71) Applicant: UCHICAGO ARGONNE, LLC, Chicago, IL (US)

(72) Inventors: Gokhan Celik, Clarendon Hills, IL (US); Kimaya Prakash Vyavhare, Woodridge, IL (US); Robert M. Kennedy, Evanston, IL (US); Ryan Hackler, Chicago, IL (US); Ali Erdemir, Naperville, IL (US); Massimiliano Delferro, Chicago, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 39 days.

This patent is subject to a terminal disclaimer.

(21) Appl. No.: 17/973,381

(22) Filed: Oct. 25, 2022

(65) Prior Publication Data
US 2023/0048467 A1    Feb. 16, 2023

Related U.S. Application Data

(62) Division of application No. 17/018,702, filed on Sep. 11, 2020, now Pat. No. 11,499,110.

(51) Int. Cl.
*C10M 111/04* (2006.01)
*B01J 21/04* (2006.01)
(Continued)

(52) U.S. Cl.
CPC ............ *C10M 111/04* (2013.01); *B01J 21/04* (2013.01); *B01J 23/002* (2013.01); *B01J 23/02* (2013.01);
(Continued)

(58) Field of Classification Search
CPC ........ B01J 21/04; B01J 23/0002; B01J 23/02; B01J 23/42; B01J 23/755; B01J 35/23;
(Continued)

(56) References Cited

U.S. PATENT DOCUMENTS

2005/0285421 A1    12/2005   Novakovich et al.
2007/0249497 A1    10/2007   Tanaka et al.
(Continued)

FOREIGN PATENT DOCUMENTS

JP      2003-321682 A    11/2003
JP         4154929 B2     9/2008
(Continued)

OTHER PUBLICATIONS

Celik, G, Kennedy, RM, Hackler, RA, Ferrandon, M, Tennakoon, A, Patnaik, S, LaPointe, AM, Ammal, SC, Heyden, A, Perras, FA., Pruski M, Scott, SL, Poeppelmeier KR, Sadow AD, Delferro M, "Upcycling Single-Use Polyethylene into High-Quality Liquid Products", ACS Cent. Sci, 2019, 5, 1795-1803 (Year: 2019).*
(Continued)

*Primary Examiner* — James C Goloboy
(74) *Attorney, Agent, or Firm* — Foley & Lardner LLP

(57) ABSTRACT

A method of upcycling polymers to useful hydrocarbon materials. A catalyst with nanoparticles on a substrate selectively docks and cleaves longer hydrocarbon chains over shorter hydrocarbon chains. The nanoparticles exhibit an edge to facet ratio to provide for more interactions with the facets.

13 Claims, 10 Drawing Sheets

(51) Int. Cl.

| | |
|---|---|
| *B01J 23/00* | (2006.01) |
| *B01J 23/02* | (2006.01) |
| *B01J 23/42* | (2006.01) |
| *B01J 23/755* | (2006.01) |
| *B01J 35/23* | (2024.01) |
| *C10M 105/04* | (2006.01) |
| *C10M 107/02* | (2006.01) |
| *C10M 177/00* | (2006.01) |

(52) U.S. Cl.
CPC .............. *B01J 23/42* (2013.01); *B01J 23/755* (2013.01); *B01J 35/23* (2024.01); *C10M 105/04* (2013.01); *C10M 107/02* (2013.01); *C10M 177/00* (2013.01); *C10M 2203/022* (2013.01); *C10M 2205/0206* (2013.01)

(58) Field of Classification Search
CPC .......................... C10M 105/04; C10M 107/02; C10M 111/04; C10M 177/00; C10M 2203/022; C10M 2205/0206
See application file for complete search history.

(56) References Cited

U.S. PATENT DOCUMENTS

| | | | |
|---|---|---|---|
| 2010/0087349 A1* | 4/2010 | Lee | C10M 111/04 |
| | | | 508/499 |
| 2011/0172088 A1 | 7/2011 | Bedard et al. | |
| 2012/0310023 A1 | 12/2012 | Huang et al. | |
| 2014/0178262 A1 | 6/2014 | Tran et al. | |
| 2015/0361374 A1 | 12/2015 | Kumar et al. | |
| 2016/0369174 A1 | 12/2016 | Kool et al. | |
| 2019/0169504 A1 | 6/2019 | Gu et al. | |
| 2020/0238269 A1 | 7/2020 | Delferro et al. | |
| 2021/0061971 A1 | 3/2021 | Delferro et al. | |

FOREIGN PATENT DOCUMENTS

| | | |
|---|---|---|
| JP | 5111246 B2 | 1/2013 |
| WO | WO-2007/126120 A1 | 11/2007 |
| WO | WO-2007/126123 A1 | 11/2007 |
| WO | WO-2021/041323 A1 | 3/2021 |

OTHER PUBLICATIONS

Quareshi, et al., "Catalytic consequences of ultrafine Pt clusters supported on SrTiO3 for photocatalytic overall water splitting," Journal of Catalysis 376, pp. 180-190 (2019).
"Advancing Sustainable Materials Management: 2014 Fact Sheet," United States Environmental Protection Agency, EPA530-R-17-01, 22 pages (2016).
Almithn & Hibbitts, "Comparing Rate and Mechanism of Ethane Hydrogenolysis on Transition-Metal Catalysts," The Journal of Physical Chemistry C 123(9), pp. 5421-5432 (2019).
Almithn & Hibbitts, "Effects of Catalyst Model and High Adsorbate Coverages in ab Initio Studies of Alkane Hydrogenolysis," ACS Catalysis 8(7), pp. 6375-6387 (2018).
Andersen, et al., "Pauling's rules for oxide surfaces," Surface Science Reports 73(5), pp. 213-232 (2018).
Beyene, "Recycling of plastic waste into fuels, a review," International Journal of Science, Technology and Society 2(6), pp. 190-195 (2014).
Burange, et al., "Heterogeneously catalyzed strategies for the deconstruction of high density polyethylene: plastic waste valorisation to fuels," Green Chemistry 17(1), pp. 146-156 (2015).
Carr, et al., "Relationship between self-seeded and epitaxial crystallization from polymer solutions: A potentially new method for molecular weight separation and a new decoration method for alkali halides," Journal of Polymer Science: Polymer Physics 8(9), pp. 1467-1490 (1970).
Celik, et al., "Upcycling Single-Use Polyethylene into High-Quality Liquid Products," ACS Central Science 5(11), pp. 1795-1803 (2019).
Che & Bennett, "The Influence of Particle Size on the Catalytic Properties of Supported Metals," Advances in Catalysis 36, pp. 55-172 (1989).
Chesters, et al., "The reflection-absorption infrared spectra of n-alkanes adsorbed on Pt(111)," Surface Science 209(1-2), pp. 89-99 (1989).
Christensen, et al., "Controlled Growth of Platinum Nanoparticles on Strontium Titanate Nanocubes by Atomic Layer Deposition," Small 5(6), pp. 750-757 (2009).
Crosby, et al., "All Roads Lead to TiO2: TiO2-Rich Surfaces of Barium and Strontium Titanate Prepared by Hydrothermal Synthesis," Chemistry of Materials 30(3), pp. 841-846 (2018).
Crosby, et al., "Wulff shape of strontium titanate nanocuboids," Surface Science 632, pp. L22-L25 (2015).
Deak, "Strontium titanate surfaces," Materials Science and Technology 23(2), pp. 127-136 (2007).
Defaud & Basset, "Catalytic Hydrogenolysis at Low Temperature and Pressure of Polyethylene and Polypropylene to Diesels or Lower Alkanes by a Zirconium Hydride Supported on Silica-Alumina: A Step Toward Polyolefin Degradation by the Microscopic Reverse of Ziegler-Natta Polymerization," Angewandte Chemie 37(6), pp. 806-810 (1998).
Dendooven, et al., "Independent tuning of size and coverage of supported Pt nanoparticles using atomic layer deposition," Nature Communications 8, 1074, 12 pages (2017).
Engelhardt, et al., "Structure Sensitivity of Acrolein Hydrogenation by Platinum Nanoparticles on BaxSr1-xTiO3 Nanocuboids," ChemCatChem 10(3), pp. 632-641 (2018).
Enterkin, et al., "Epitaxial Stabilization of Face Selective Catalysts," Topics in Catalysis 56(18-20), pp. 1829-1834 (2013).
Enterkin, et al., "Oriented Catalytic Platinum Nanoparticles on High Surface Area Strontium Titanate Nanocuboids," Nano Letters 11(3), pp. 993-997 (2011).
Enterkin, et al., "Propane Oxidation over Pt/SrTiO3 Nanocuboids," ACS Catalysis 1(6), pp. 629-635 (2011).
Erdemir, et al., "Carbon-based tribofilms from lubricating oils," Nature 536, pp. 67-71 (2016).
Erdman, et al., "Surface Structures of SrTiO3 (001): A TiO2-rich Reconstruction with a c(4×2) Unit Cell," Journal of the American Chemical Society 125(22), pp. 10050-10056 (2003).
Flaherty & Iglesia, "Transition-State Enthalpy and Entropy Effects on Reactivity and Selectivity in Hydrogenolysis of n-Alkanes," Journal of the American Chemical Society 135(49), pp. 18586-18599 (2013).
Flaherty, et al., "Catalytic Ring Opening of Cycloalkanes on Ir Clusters: Alkyl Substitution Effects on the Structure and Stability of C—C Bond Cleavage Transition States," The Journal of Physical Chemistry C 119(5), pp. 2597-2613 (2015).
Flaherty, et al., "Metal-Catalyzed C—C Bond Cleavage in Alkanes: Effects of Methyl Substitution on Transition-State Structures and Stability," Journal of the American Chemical Society 136(27), pp. 9664-9676 (2014).
Flaherty, et al., "Theoretical and kinetic assessment of the mechanism of ethane hydrogenolysis on metal surfaces saturated with chemisorbed hydrogen," Journal of Catalysis 311, pp. 350-356 (2014).
Goodenough, "Electronic and ionic transport properties and other physical aspects of perovskites," Reports on Progress in Physics 67(11), pp. 1915-1993 (2004).
Grillo, et al., "From Single Atoms to Nanoparticles: Autocatalysis and Metal Aggregation in Atomic Layer Deposition of Pt on TiO2 Nanopowder," Small 14(23), 1800765, 11 pages (2018).
Hahladakis, et al., "An overview of chemical additives present in plastics: Migration, release, fate and environmental impact during their use, disposal and recycling," Journal of Hazardous Materials 344, pp. 179-199 (2018).
Hazrat, et al., "Utilization of Polymer Wastes as Transport Fuel Resources—a Recent Development," Energy Procedia 61, pp. 1681-1685 (2014).
Hibbitts, et al., "Effects of Chain Length on the Mechanism and Rates of Metal-Catalyzed Hydrogenolysis of n-Alkanes," The Journal of Physical Chemistry C 120(15), pp. 8125-8138 (2016).

(56) References Cited

OTHER PUBLICATIONS

Hopewell, et al., "Plastics recycling: challenges and opportunities," Philosophical Transactions of the Royal Society B: Biological Sciences 364(1526), pp. 2115-2126 (2009).
Hsieh, et al., "Shape-Tunable SrTiO3 Crystals Revealing Facet-Dependent Optical and Photocatalytic Properties," The Journal of Physical Chemistry C 123(22), pp. 13664-13671 (2019).
Inoue, et al., "Structural and dynamical studies of 13C-labeled polyethylene adsorbed on the surface of silica gel by high-resolution solid-state 13C NMR spectroscopy," Acta Polymerica 46, pp. 420-423 (1995).
International Search Report & Written Opinion for PCT/US2020/047654 dated Nov. 20, 2020, 9 pages.
Jena, et al., "Studies on the ionic transport and structural investigations of La0.5Li0.5TiO3 perovskite synthesized by wet chemical methods and the effect of Ce, Zr substitution at Ti site," Journal of Materials Science 40, pp. 4737-4748 (2005).
Jia, et al., "Efficient and selective degradation of polyethylenes into liquid fuels and waxes under mild conditions," Science Advances 2(6), e1501591, 7 pages (2016).
Kanbur, et al., "Catalytic carbon-carbon bond cleavage and carbon-element bond formation give new life for polyolefins as biodegradable surfactants," Chem 7(5), pp. 1347-1362 (2021).
Kennedy, et al., "Replication of SMSI via ALD: TiO2 Overcoats Increase Pt-Catalyzed Acrolein Hydrogenation Selectivity," Catalysis Letters 148(8), pp. 2223-2232 (2018).
Kienzle & Marks, "Surface transmission electron diffraction for SrTiO3 surfaces," CrystEngComm 14(23), pp. 7833-7839 (2012).
Kienzle, et al., "Vacant-site octahedral tilings on SrTiO3 (001), the ([sqrt]13 x [sqrt]13)R33.7 surface, and related structures," Physical Review Letters 106(17), 176102, 4 pages (2011).
Kresse & Furthmuller, "Efficiency of ab-initio total energy calculations for metals and semiconductors using a plane-wave basis set," Computational Materials Science 6(1), pp. 15-50 (1996).
Kresse & Furthmuller, "Efficient iterative schemes for ab initio total-energy calculations using a plane-wave basis set," Physical Review B 54(16), pp. 11169-11186 (1996).
Kresse & Hafner, "Ab initio molecular dynamics for liquid metals," Physical Review B 47(1), pp. 558-561 (1993).
Kresse & Hafner, "Ab initio molecular-dynamics simulation of the liquid-metal-amorphous-semiconductor transition in germanium," Physical Review B 49(20), pp. 14251-14269 (1994).
Kurosu, et al., "Structural characterization of 13C-labeled n-tetracosane adsorbed on the surface of silica gel by high-resolution solid-state 13C NMR spectroscopy," Journal of Molecular Structure 516(2-3), pp. 177-184 (2000).
Lin, et al., "Synthesis-Dependent Atomic Surface Structures of Oxide Nanoparticles," Physical Review Letters 111(15), 156101, 5 pages (2013).
Manner, et al., "Melting of Rodlike Molecules on Pt(111). Infrared Spectroscopic Studies of Isotopically Labeled n-Alkanes," The Journal of Physical Chemistry B 102(44), pp. 8816-8824 (1998).
Marks & Peng, "Nanoparticle shape, thermodynamics and kinetics," Journal of Physics: Condensed Matter 28(5), 053001, 48 pages (2016).
Mastral, et al., "Catalytic degradation of high density polyethylene over nanocrystalline HZSM-5 zeolite," Polymer Degradation and Stability 91(12), pp. 3330-3338 (2006).
Nakaji, et al., "Regioselective hydrogenolysis of alga-derived squalane over silica-supported ruthenium-vanadium catalyst," Fuel Processing Technology 176, pp. 249-257 (2018).
Non-Final Office Action on U.S. Appl. No. 17/018,702 dtd Apr. 7, 2022.
Notice of Allowance on U.S. Appl. No. 17/018,702 dtd Jul. 21, 2022.
Oya, et al., "Catalytic Production of Branched Small Alkanes from Biohydrocarbons," ChemSusChem 8(15), pp. 2472-2475 (2015).
Rabuffetti, et al., "Synthesis-Dependent First-Order Raman Scattering in SrTiO3 Nanocubes at Room Temperature," Chemistry of Materials 20(17), pp. 5628-5635 (2008).
Rahimi & Garcia, "Chemical recycling of waste plastics for new materials production," Nature Reviews Chemistry 1, 0046, 11 pages (2017).
Tennakoon, et al., "Catalytic upcycling of high-density polyethylene via a processive mechanism," Nature Catalysis 3, pp. 893-901 (2020).
Wong, et al., "Catalytic Cracking of LDPE Dissolved in Benzene Using Nickel-Impregnated Zeolites," Industrial & Engineering Chemistry Research 55(9), pp. 2543-2555 (2016).
Wu, et al., "Formation and Nature of Carbon-Containing Tribofilms," ACS Applied Materials & Interfaces 11(17), pp. 16139-16146 (2019).
Yang & Somorjai, "Adsorption and Reactions of C6 Hydrocarbons at High Pressures on Pt(111) Single-Crystal Surfaces Studied by Sum Frequency Generation Vibrational Spectroscopy: Mechanisms of Isomerization and Dehydrocyclization of n-Hexane," Journal of the American Chemical Society 126(24), pp. 7698-7708 (2004).
Zhang, et al., "Adhesion of Pt Nanoparticles Supported on y-Al2O3 Single Crystal," The Journal of Physical Chemistry C 117(41), pp. 21407-21412 (2013).
Zhang, et al., "Polyethylene upcycling to long-chain alkylaromatics by tandem hydrogenolysis/aromatization," Science 370(6515), pp. 437-441 (2020).
Zhuo & Levendis, "Upcycling waste plastics into carbon nanomaterials: A review," Journal of Applied Polymer Science 131(4), 39931, 14 pages (2014).

\* cited by examiner

CATALYTIC UPCYCLING OF POLYOLEFINS INTO LUBRICANTS

CROSS-REFERENCE TO RELATED APPLICATIONS

This application is a divisional of U.S. patent application Ser. No. 17/018,702, filed Sep. 11, 2020, the contents of which is incorporated herein in its entirety by reference.

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates generally to a catalyst and process for selectively converting plastics into lubricant products.

BACKGROUND

Synthetic polymers have quickly become engrained in everyday use. In particular, polymers—commonly referred to as plastics—have become a ubiquitous part of modern consumer culture, consuming a large amount of global resources and generating a large amount of waste materials. In 2015, 407 million metric tons of plastic were manufactured globally, with nearly 50% of that being various grades of polyethylene ("PE") and polypropylene ("PP"), the two most common polyolefins. The vast majority of those plastics will ultimately be thrown away if current usage trends continue, where currently nearly 60% of plastics are destined for landfills. Less than 20% of plastics are currently recycled.

In light of both the large drain on global resources and the massive amount of waste material generated, plastics represent a tremendous and as-yet-untapped domestic resource for the production of chemicals and new materials. Efficient technologies for extracting this value from discarded polymers would be equivalent to recovering about 3.5 billion barrels of oil ($175 billion at $50/barrel) each year and could create entirely new industries. Currently, most of the stored energy in plastics is irreversibly lost into landfills that are overflowing throughout our planet. While physical recycling is desirable and wide-spread in many areas for a wide range of materials, it is most effective for recovering glass, paper, and metals such as aluminum. To date, recycling has not be able to efficiently and cleanly recoup the inherent value in plastics, especially low density polyethylene (plastic bags), polypropylene, and polystyrene. Existing deconstruction approaches can convert the macromolecules into smaller fragments, but the result is an extremely broad distribution of lighter hydrocarbons whose low value makes them much less useful than virgin fossil fuels and petrochemicals.

Mechanical recycling, sometimes referred to as secondary recycling, is how most plastics are recycled today. Because of physical limitations of the process and the wide range of plastics in the waste stream, mechanically recycled plastics are often lower quality than their virgin source and are used for less valuable product (i.e., downcycled).

Chemical recycling, where chemical reactions are used to modify or separate polymers, has the potential to be cheaper and create more valuable materials than mechanical recycling. Some polyesters, such as polyethylene terephthalate ("PET"), can be depolymerized back to the monomers, which can then be repolymerized into new plastics. Recent work has shown that polystyrene ("PS") can be separated from other plastics and additives through selective dissolution. High-temperature decomposition under reduced oxygen concentrations to prevent combustion (i.e., pyrolysis) can convert a wide range of polymers into a mixture of liquid or gas alkanes, alkenes, alkynes, and aromatics through radical reactions, which can be used as fuel, syngas, etc. Pyrolysis is the most studied and most mature chemical recycling technology; however, high temperatures required to initiate pyrolysis and the inherently unselective nature of the process limits the long-term value of pyrolysis for recycling plastic waste.

Prior work has developed processes to utilize waste plastic as a feed stock. For example, current polymer conversion processes utilize catalytic hydrocracking or pyrolysis with zeolites, or gasification (Beyene (2014); Hazrat, et al. (2014)). These processes which occur at high temperature, above 500° C., lead to a broad distribution of fuel-type hydrocarbons (Zhuo, et al. (2014); Beyene (2014); WO2007126123A1; JP2003321682A). However, these current processes include several limiting or undesirable steps. For example, the plastic or polymer has to be dissolved in solvent at high temperature, such as 150° C. (WO2007126123A1; JP2003321682A; JP4154929B2; JP5111246B2), and washed, and impurities have to be extracted to remove chlorine compounds that are detrimental to catalysts (WO2007126120A1). The addition of solvent or water to the process is not only costly but it also decreases the overall yield (Beyene (2014)). Additional reactions after hydrogenolysis have been reported, including cyclization for increasing the benzene, toluene, and xylene ("BTX") fraction (JP2003321682A) and separations of the products (JP41549229B2; JP41549229B2; JP5111246B2). Conditions for hydrogenolysis are harsher, with temperatures ranging from 300-500° C., and pressure ranging from 145-2950 psi (WO2007126123A1; JP2003321682A).

Thus, there remains a need for a process for recycling plastics into useful materials, in particular for upcycling plastics into lubricants.

SUMMARY

Some embodiments described herein relate generally to a method of processing a polymer into a lubricant. The method comprising: exposing, at a temperature of 150-350° C. and a pressure of 100-200 psi for 12-72 hours, a plurality polymer molecules to a catalyst comprising a substrate having a plurality of catalytic nanoparticles deposited thereon. A first polymer molecule of the plurality of polymer molecules is docked to the catalyst. At least one carbon-carbon bond of the first polymer molecule is cleaved, forming a plurality of hydrocarbon fragments from the cleaving. The method further comprises selectively docking to the catalyst a second polymer molecule of the plurality of polymer molecules, preferentially over the plurality of hydrocarbon fragments and cleaving at least one carbon-carbon bond of the second polymer molecule, forming a second plurality of hydrocarbon fragments.

Other embodiments described herein relate generally to a lubricant comprising 10-40 wt % of a mixture of hydrocarbon fragments cleaved from polyethylene, the mixture being monomodal and having a molar mass distribution of from 400-1000 Da, and 90-60 wt % poly-α-olefin.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 2A is a photograph of the wear following an experimental test. FIG. 2B illustrates Raman analysis for the wear regions indicated in FIG. 2A as well as the indicated materials.

FIG. 3A shows the coefficient of friction ("CoF") plot for Group III, PAO4, upcycled linear low-density polyethylene ("LLDPE"), upcycled bubble wrap, PAO10, and upcycled high-density polyethylene ("HDPE"). FIG. 3B shows wear scar volume ("WSV") for the mineral, synthetic, and upcycled lubricants at 100° C. FIGS. 3C-3H show profilometry images of wear scarring using the labeled lubricant. The CoF and wear scar data show upcycled HDPE is on par with the best expensive synthetic lubricant (PAO10).

FIGS. 4A-4B show CoF plots using a mixture of lubricants ranging from 100% PAO10 to 100% HQL at room temperature (FIG. 4A) and 100° C. (FIG. 4B). FIG. 4C shows molecular weight distribution plots from gel permeation chromatography ("GPC") for HQL and PAO10 lubricants. FIG. 4D shows WSV across a mixture of PAO10 and HQL lubricants at room temperature and 100° C. Tribological performance is optimized at both operating temperatures when 20-30% HQL by mass is used.

Figure 1:
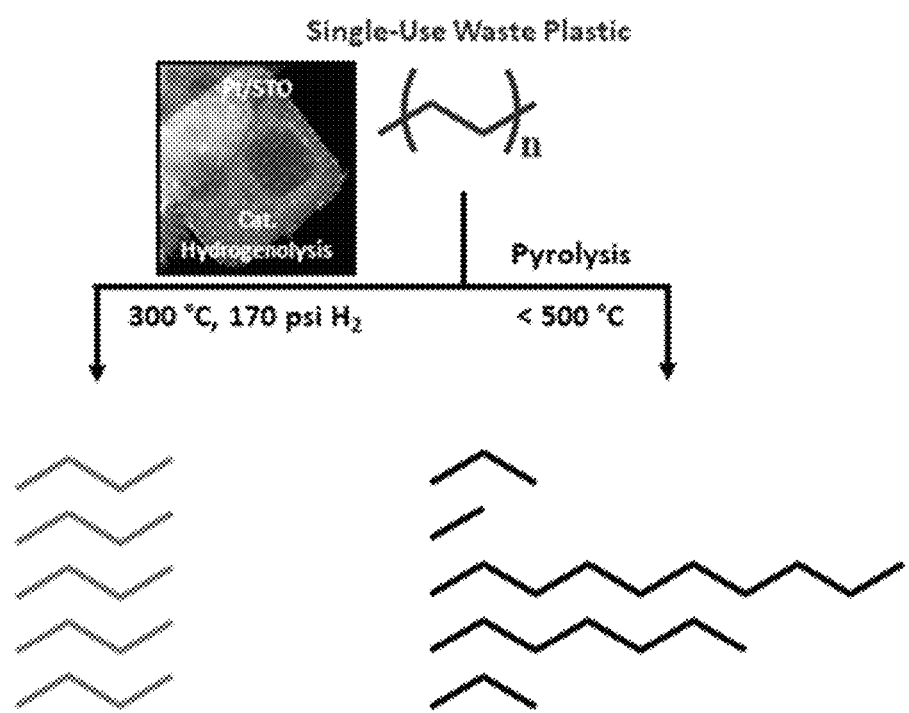
FIG. 1 shows a comparison of waste plastic conversion strategies, with schematic representation of the distribution and size variance between products from catalytic hydrogenolysis (left) and pyrolysis (right) of single-use waste plastics.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments herein relate to catalysts for and method of processing polyolefins into lower molecular weight hydrocarbon materials, referred to herein as HQLS, specifically desirable lubricant products having tribological properties on par with commonly used industry standard lubricants, such as PAO10. Such HQLs are a liquid or wax in the paraffin molecular weight range, with a dispersity (Đ) approaching 1. Such HQLs could be used as-made as waxes or lubricants or functionalized to make surfactants, poly-α-olefins ("PAOs"), new polymers, etc., thereby retaining the value of the long carbon chains built up in the original polymerization. As used herein, in one embodiment, HQLs are saturated, non-aromatic hydrocarbons (alkanes), without heteroatoms (e.g., chlorine) or functional groups (e.g., alcohols, esters, sulfates), consisting of only carbon and hydrogen. The HQLs may have varying degrees of branching of the hydrocarbon chain, dependent primarily on the qualities of the starting polymers (e.g., HDPE, PP, low density PE ("LDPE"), and LLDPE) and secondarily on the catalyst. In one embodiment, HQLs are hydrocarbon materials with a very narrow range of molecular weights. In a further embodiment, HQLs comprise only carbon and hydrogen. The average molecular weight can be tuned to the application by the catalytic process.

In particular, embodiments described herein utilize hydrogenolysis, the cleavage of carbon-carbon bonds by a catalyst and hydrogen, as a pathway to formation of the HQLs from the polymer feedstock. Unlike pyrolysis, hydrogenolysis can operate at lower temperatures and favors the formation of alkanes over unsaturated hydrocarbons. Catalysts facilitate: (i) docking of a polymer chain at a specific location, (ii) control of the configuration of the adsorbed chain on the surface of the catalyst, and (iii) cleavage of a certain bond at a precise position along the chain to deconstruct hydrocarbon polymers efficiently into fragments of relatively uniform size. One such catalyst is platinum on strontium titanate nanocuboid catalysts.

As used herein, smaller fragments refer to fragments having a size, typically expressed in terms of carbon backbone length of the fragment, selected based on the chose parameters of the catalytic material, most notably particle size, particularly the facets relative to corners or edges of the particle. Further, references herein to "short alkanes" refers to alkanes within the size range from 400-1000 Da. In one embodiment, the narrowness of the fragment size, regardless of the molecular weight, is ~1.00-~1.02Đ. The metal nanoparticle catalysts promote carbon-carbon bond cleaving in presence of hydrogen (hydrogenolysis) through a "chopping" approach wherein the polymer is docked and cleaved.

As described further below, catalytic materials provide for a selective cleaving of the hydrocarbon. Nanoparticles ("NPs") have facets and edges due to their crystalline structure. Edges of a solid catalytic material, such as Pt or Ni, cleave at multiple adjacent locations on a hydrocarbon. For example, when a hydrocarbon is docked to the catalyst and positioned to be engaged by the edges, the hydrocarbon may be cleaved in multiple locations resulting in relatively small hydrocarbon fragments (e.g., C50 or less, specifically such as C10 or less) and where the resultant fragments are gases, thus referred to as gaseous products or waste gases. In contrast, the facets of a catalytic metal, such as Pt, have a significantly reduced the chance of cleaving multiple nearby sites on a hydrocarbon. The result is that the higher the ratio of facets to edges, the more the result of the catalysis will be larger fragments, such as above C10 or above C50. The adsorption of the carbon chain to the metal and support facilitates the favoring of larger chains. It is believed that there is some effect of the strong ordering of hydrocarbons (e.g., polyethylene on the catalyst base material, such as $SrTiO_3$ ("STO") cuboids) and that 1) there is a stronger interaction between the hydrocarbon chains and $Pt/SrTiO_3$ than Pt/gamma-alumina, 2) for both catalysts, the interaction strength increases with carbon chain length, and 3) both catalysts, to varying degrees, preferentially adsorb and, therefore, hydrogenolyze the longest chains of the hydrocarbons first.

Specifically, metal NPs (e.g., Pt) of a desired size or size range supported on the surface of a substrate. The two parameters that control the ratio are 1) the interfacial energy of the metal and support (this can be affected by the facet of the support, or if the metal particle grows on a step or defect on the surface), which controls the stable shape of the metal particle and 2) the size of the metal particle, which can be controlled by the deposition process (e.g., number of atomic layer deposition ("ALD") cycles) or post-deposition treatments (e.g., chloro-oxidative redispersion), which determines the relative size of the facets to edges for a given shape, with facets increasing in area faster than the edges increase in length as the particle grows in volume. For the embodiments using $Pt/SrTiO_3$, the preferred edge:facet ratio would be values less than 0.265 (e.g., 1c-$Pt/SrTiO_3$).

Preferably, the substrate is nonreactive with hydrocarbons. The substrate may be porous (meso- or nano-porous) or non-porous, a crystal material or noncrystal. For example, the substrate may be a perovskite (e.g., strontium titanate) or alumina platelet or spherical materials, the substrate may also be a high surface area porous material, such as mesoporous gamma-alumina, or other oxide materials of varying degrees of shape, faceting, or porosity. The substrate may be any material compatible with ALD and not catalytically reactive with the hydrocarbons. As described further herein the porosity of the support may have a significant effect on the extent of gas formation (i.e., on the size of the fragments resulting from the hydrocarbon cleavage).

In one embodiment, the support material is comprised of crystalline nanocuboids and is a single phase material that is non-reactive with the desired hydrocarbons to be processed. For example, the support material may be a perovskite, for example a perovskite selected from the group consisting of strontium, barium, and calcium titanate or other perovskites with general formula $ABO_3$, or those that are oxygen-deficient, $ABO_{3-x}$ where $0 \leq x \leq 0.5$. One embodiment utilizes STO as the substrate. The platinum metal and STO have approximately the same lattice constants, creating an epitaxial arrangement of the atoms which stabilizes the interface between the two phases creating the stable PtSTO catalyst, with Pt dispersed on the surfaces of the STO nanocuboids. These Pt NPs are terminated by the family of {111} and {100} surfaces. The Pt NPs on STO are fully exposed to polymer to be processed. The support material may further be a hybrid material comprising a high surface area support material that is amorphous (with a perovskite, such as STO, added thereto).

In another embodiment, the substrate may be a nonporous material, such as alumina. The nonporous substrate may be flat, such as sheet-like, or may be three-dimensional, such as a sphere. The particles sizes are similarly controlled as in the above embodiment using a porous substrate to provide control of the ratio of the facet to edges/corners.

The porosity of the support can be used to control selectivity of the catalyst. For example, decreasing porosity increases selectivity to HQLs, owing to diffusion of polyolefins in the pores, which increases contact time on a single polyolefin molecule and therefore the amount of light gases produced.

The metal NPs are sized to control the facet to edges/corners ratio tuned based on the deposition parameters, including precursor contact time, number of metal deposition cycles, metal precursor, and temperature.

As described, the catalytic material includes NPs on the support material. The catalytic materials may be deposited, in one embodiment, by known deposition techniques, such as chemical vapor ("CV") incipient wetness, wet impregnation, or the like. The deposition process should be one with a temperature sufficiently low to not degrade or damage support material. In one particular process, the catalytic materials are deposited/grown by ALD. During ALD, the metal precursors bind to the surface (the oxide and already deposited metal particles) as single metal atoms surrounded by ligands in the A-step. When the ligands are driven off in the B-step by a secondary gas (often a reducing or oxidizing agent), the metal atoms become mobile on the surface and move until they reach a stable site. Depending on the reaction conditions, this can be as single atoms, small clusters, or large NPs and can involve moving distances of parts of a nanometer to many nanometers across the surface. The ALD conditions can be modified to control these parameters. In addition, the conditions (temperature, pressure, etc.) of the A-step and B-step can affect whether growth on subsequent cycles primarily add to existing seeds or whether new NPs form.

In one embodiment, subsequent ALD deposition cycles of platinum are primarily added to existing seeds, leading to highly uniform growth from cycle to cycle, with small changes (increases) in particle distance with cycles. The deposition process allows for controlled deposition and growth of NPs of the catalytic metal on the substrate. Once deposited on the support (such as on an exposed surface), the metal is in the form of a nanoparticle. In particular, the average particle size ranged from 1.2±0.2 (1 cycle) to 2.9±1.1 (10 cycles) nanometers increasing with the number of ALD cycles, and could be increased further with additional cycles or decreased to even smaller sizes by changing the ALD growth conditions.

The NPs have facets and edges defining the surface. The effect of interfacial energy can be compared to a water droplet on a hydrophobic or hydrophilic surface—on the former, it will bead up and expose a lot of surface area; on the latter, it will smooth out across the surface. Unlike a water droplet, a metal particle will have flat facets and sharp edges. Frequently, when there is a lower (stronger) interfacial energy with the support, the resultant stable metal nanoparticle shape minimizes the number of exposed edges. The interfacial energy can be controlled by the choice of metal and support, and can be modified by substitution in the support (e.g., $Ba_xSr_{1-x}TiO_3$), oxygen vacancies in the support (e.g., $SrTiO_{3-\delta}$), and alloying of the metal (e.g., Pt and palladium or other combinations). The interfacial energy may also vary depending on the crystallographic facet of the support exposed. In the case of Pt and $SrTiO_3$, the interfacial energies on the different low-index facets of SrTiO$_3$ are similar, but they may vary significantly for other oxides with lower crystallographic symmetry. Notably, facets for catalytic metal such as Pt are selective to desirable hydrocarbons (i.e., C10 or longer or C50 or longer carbon chains), rather than small alkanes, such as gaseous products. In contrast, edges are associated with selectivity to cleaving of the hydrocarbons into small molecules, often gaseous waste materials. As noted, edge sites of metal particles tend to be more active for reactions like hydrogenolysis. It is likely that metal particles with a higher ratio of edge sites will make many rapid cuts to the same hydrocarbon chain, producing light gases.

The NPs could be composed of a single element or of multiple elements. Deposition on support materials may be in an amorphous (i.e., random arrangement). The size and shape of the metal NPs can be selected to decrease the amount of unwanted light gases (e.g., methane) that are produced, with metal particles that have a lower percentage of edge sites exhibiting less gas production.

The NPs may be deposited by ALD. The ALD process may be tuned to deposit NPs with a desired inter-particle space associated with the desired length of the resultant polymer chains following cleaving.

While in some embodiments NPs will be deposited using ALD, the ALD of noble metals, such as Pt, has been shown to produce NPs in the early stages of growth. The modification of steric parameters of the ALD precursors can change the nucleation density, giving rise to NPs with different sizes and inter-particle distances. In addition, variation of the ALD deposition conditions (e.g., contact time, flow rate, number of deposition cycles, and temperature) is also employed to yield an ordered array of metal NPs with controlled inter-particle distance.

In one embodiment, SrTiO$_3$ serves as an excellent support because its crystalline, highly-ordered, and well-characterized surfaces assist the assembly of ordered NP arrays. SrTiO$_3$ is an archetypical cubic perovskite (Pm-3m), optically transparent with a high band gap. The SrTiO$_3$ used in the present study features single crystal nanocuboids having a sub-100 nm average size, with {100} facets and rounded stepped edges. It is synthesized under hydrothermal conditions, and the majority {100} surface termination has been determined to be the ($\sqrt{13}\times\sqrt{13}$)R33.7° TiO$_2$ double layer surface reconstruction. The SrTiO$_3$ nanocuboids are used as a support for deposition of Pt NPs to form a Pt/SrTiO$_3$ hydrogenolysis catalyst. ALD is chosen for this process because it allows programmed control over key catalyst features that are potentially important to hydrogenolysis. ALD affords Pt NPs rather than films, and the size of the Pt NP depends on the ALD conditions and the interaction between the metal and the support. The close lattice-match between the cubic SrTiO$_3$ and face-centered cubic ("FCC") Pt results in a cube-on-cube epitaxy for Pt NPs on the {100} facets of SrTiO$_3$. The cube-on-cube epitaxy contributes to a large interfacial energy term for the Pt/SrTiO$_3$ interface, which in turn stabilizes the Pt NPs.

In one embodiment, the process includes, and the catalyst facilitates, hydrogenolysis. Hydrocarbon polymers interact with the catalytic material primarily through multi-site (relatively weak) Van der Waals interactions. In some embodiments, the positioning of the NPs is semi-random. There is control over spacing, which is mainly dependent on the diffusion distance and nucleation size of the Pt particles, rather than being on ordered binding sites on the support surface. The particles are evenly spaced, but not highly symmetric or ordered. The strength of adsorption appears to increase with length, leading to an increased concentration of long hydrocarbons at the catalyst surface and, therefore, an increased probability of cleaving the longer chains.

The hydrogenolysis cleaves a carbon-carbon bond in the polymer to create smaller fragments. Feedstock for the process may be unsorted polymer materials, such as commonly used consumer plastics, or may be sorted materials to provide a common polymer as feedstock and result in a consistent hydrocarbon fragment. The catalytic material includes both docking and chopping sites. The docking site helps the polymer to stay close (bounded) to the catalytic active sites (the chopping sites) and not diffuse in the reaction media. A docking site can be also a chopping site, such as where both are the catalytic metal nanoparticle. The preferential docking and cleaving of larger hydrocarbon chains over smaller hydrocarbon chains promotes a more uniform decrease in average hydrocarbon size while maintaining a tighter distribution of sizes, as reflected in the lower percentage of products being small chain materials such as alkane gases.

In one embodiment, the size of the resultant carbon fragment is correlated with a number of factors. As discussed above, the competition to adsorb on the catalyst surface affects the probability of a hydrocarbon chain getting cleaved. As a longer chain is cleaved into two short chains, the two fragments are then out-competed by a longer chain still in the melted mixture, which adsorbs to the catalyst in their place. This exchange process continues, with the highest fraction adsorbing, cleaving, and desorbing, resulting in the population decreasing in length and narrowing in dispersity, until the reaction is stopped or the product is reduced to gases. The rate of exchange may be modified by the reaction temperature and the adsorption energy of the polymer on the catalyst and support.

In one embodiment, the process for producing HQLs is performed at a temperature range of 150-350° C., for example at 350° C., for 12-72 hours and at a pressure of 100-200 psi. The catalyst "loading" may range from 0.5-20 wt % catalyst metal (e.g., platinum). Hydrogenolysis of polymers using the catalyst described herein, in one embodiment, proceeds without the use of a solvent (i.e., solvent-free). As used herein, "solvent-free" refers to the process being carried out with no added solvents (i.e., only the use of polymer products as a feedstock). Note, the polymer products may have incidental solvent either as residue, such as in a plastic container or as a contaminant in the polymer itself while still be "solvent-free."

The resultant HQL lubricants exhibit a range of desirable tribological properties. The HQL lubricants comprise a mixture of hydrocarbons of various chain lengths and polymerization. The branching is dependent on the feedstock where a more branched feedstock will result in a more branched HQL. Given a specific polymer feedstock, a narrowly defined alkane ranging from 400-1000 Da will be produced (depending on the reaction conditions). This ranges from C$_{30}$ to C$_{76}$ alkanes. It is believed that polymer feedstocks will result in a degree of branching ranging from 10 branches per 1000 carbon to 400 branches per 1000 carbon.

One embodiment uses polyethylene (M$_n$=7.7 kD, Đ=3.4) as a feedstock. The PE is interacting with the Pt/STO catalyst under hydrogen (up to 300 psi) at 300° C. for 72 hours. The resultant product is a monomodal, narrowly distributed lubricant (e.g., M$_n$=0.6 kD, Đ≈1.0).

One potential application for HQLs is as a base oil component of lubricants. A lubricant is composed of the base oil, which provides the majority of the lubricating properties, and additives, which are used to improve stability and longevity, and to fine-tune the performance of the lubricant for a specific application. Approximately 40 million tons of lubricants are consumed every year, of which the majority are distillates (Group II, Group III), and a growing percentage are synthetic hydrocarbons (e.g., PAOs). PAOs are significantly more expensive than Group II and Group III base oils (×1.5-8 the cost per ton) but are becoming increasingly important as the industry shifts to long lifetime, high efficiency lubricants. PAOs are highly branched oligomers of α-olefins (octene, decene, etc.), that can be made in a range of viscosities, have low pour points, and low concentrations of contaminants (e.g., sulfur) or unsaturated molecules that can decrease lifetime. Polyolefin plastics (e.g., those made from purified ethylene, propylene, etc.) are effectively a pre-purified low-sulfur hydrocarbon feedstock. HQLs, derived from the hydrogenolysis of plastic waste, would have lower inherent impurity levels than distilled base oils, similar to synthetic PAOs. HQLs could be a competitive lubricant base oil, taking advantage of the purified, polymerized hydrocarbon feedstock of plastic waste to make a high purity, low sulfur base oil.

In one embodiment, HQLs are combined with a synthetic lubricant, such as a PAO (e.g., PAO10). A mixture of HQL and PAO10 exhibits a superior tribological performance across a range of temperatures. In one embodiment, the mixture is 10-40% HQL, such as 20-30%, and may include a balance of PAO or, for example, 90-60 wt % PAO. Performance at a specific temperature is dependent on the size, distribution, and degree of branching for the HQL. Generally speaking, HQLs of a larger size will be more appropriate for higher temperature applications. HQLs with a larger degree of branching will be more appropriate for higher temperature applications as well. It is believed that HQLs in general, regardless of the branching or size, will be functional from room temperature to 100° C., but generally anything above ~40° C. is expected to exhibit superior performance to below 40° C. preferred. Using HQL as an additive shows an improvement by creating a mixture that borrows the superior lubrication from the smaller alkanes while preventing debris formation and degradative oxidation processes thanks to the larger, branched PAO10.

Experimental Examples

Experiments investigated the tribological properties and lubricious performance of the resultant HQL lubricants by a spin test mechanism and by a rolling pin mechanism. compared to commercially available Pt/Al$_2$O$_3$ catalysts. It will be seen that the catalytic performance of Pt/SrTiO$_3$ balances on preferential binding of longer hydrocarbon chain onto the Pt surface and the rate of hydrogenolysis at different catalytic sites (facet versus edge/corner). Thus, controlling the Pt edge to facet ratio is essential for suppressing over-hydrogenolysis.

Hydrogenolysis was performed on various plastics of differing structure, molecular weight, polydispersity. HDPE (M$_w$≈38,550 Da, M$_n$≈5,400 Da, Đ=7.1) were chosen as significantly different polyethylene samples to benchmark against industry standard oils such as Group III mineral oil and synthetic PAO10. Tribological evaluation of the resulting HQLs and lubricants was done via a ball-on-disc test at 25° C. and 100° C. to evaluate resulting friction and wear.

Catalyst Synthesis

The SrTiO$_3$ nanocuboid catalyst support was synthesized via hydrothermal methods described previously. In-situ O$_3$ (Pacific Ozone L11 Ozone Generator, UHP 20 Torr O$_2$ source, 70% output O$_3$) was dosed at 200° C. for 2 hours to remove carbonates and other adsorbates that would interfere with deposition. Catalytic platinum NPs were then deposited onto the SrTiO$_3$ support at 200° C. using 3 cycles of Pt ALD in a plug flow reactor. The Pt precursor (MeCp)PtMe$_3$ (Trimethyl(methylcyclopentadienyl) platinum(IV)) (Strem Chemicals, 99%) was introduced with 30 micropulses for a total static exposure time of 5400 seconds. Pt bubbler was set to 65° C. and precursor lines set to 80° C. Nitrogen purges of 300 seconds were used between each micropulse to remove any unreacted precursor and products. UHP O$_2$ was subsequently dosed to complete one ALD cycle, with 40 micropulses totaling a static exposure time of 7200 seconds with nitrogen purges of 300 seconds in between each pulse. Static dosing was achieved by valving off the pump from the outlet. This was done to maximize the efficacy of exposing the Pt precursor to the support. On-line quadrupole mass spectrometry (QMS 300 Stanford Research Systems) was used to ensure the SrTiO$_3$ surface was saturated by the end of Pt precursor dosing by monitoring methane signal (m/z=16) after each pulse.

Hydrogenolysis of Polyolefins

Hydrogenolysis of various polyolefins was done under the same conditions. In a Parr autoclave reactor, ~300 mg of Pt/STO catalyst and ~3 g of the corresponding polymer were placed inside a glass sleeve inside the reactor. The reactor was sealed with a polytetrafluoroethylene ("PTFE") gasket, tightened, and placed in the reactor assembly. The PTFE gasket kept the seal for the duration of the reaction. Air was discharged from the reactor prior to heating by flushing the lines, valves, and reactor with He. The reactor was then ramped up to 300° C. at roughly 5° C./minute until a stable temperature was established for 30 minutes. Then, the impeller was set to 1600 rpm to minimize mass transfer limitations. Finally, the reactor was flushed and charged with H$_2$ (UHP) to 170 psi for hydrogenolysis to start. The polyolefins that underwent hydrogenolysis include HDPE (M$_w$=~35 k, M$_n$=~7.7 k, Millipore Sigma), LLDPE (melt index 1.0 g/10 minutes, Millipore Sigma), and bubble wrap (Amazon).

After the reaction, the reactor was cooled to room temperature and vented to atmosphere. The liquid product found between the walls of the reactor and the walls of the glass sleeve was extracted and washed with n-hexane. The liquid product was then filtered through silica gel (Davisil Grade 646, Millipore Sigma) to remove any catalyst particles, and any remaining n-hexane was driven off under low vacuum at ~55° C.

Characterization of Upcycled Polymer Lubricant

Lubricants from hydrogenolysis of HDPE, LLDPE, and commercial bubble wrap, as well as industry standard lubricants PAO10, PAO4, and Group III mineral oil were analyzed for molecular weight (M$_n$ and M$_w$) and molecular weight distribution (M$_w$/M$_n$) by matrix-assisted laser desorption/ionization ("MALDI") mass spectrometry and high-temperature GPC (Agilent-Polymer Laboratories 220) equipped with RI and viscometer detectors. Monodisperse polystyrene standards were used for calibration (ranging from ~400-~1.1 MDa) and monodisperse polyethylene standards were tested with the resulting calibration curve. The column set included 3 Agilent PL-Gel Mixed B columns and 1 PL-Gel Mixed B guard column. 1,2,4-trichlorobenzene ("TCB") containing 0.01 wt % 3,5-di-tert-butyl-4-hydroxy-toluene ("BHT") was chosen as the eluent at a flow rate of 1.0 mL/minute at 150° C. The lubricant samples were prepared in TCB at a concentration of ~2.0 mg/mL and heated at 150° C. for 24 hours prior to injection.

Tribological Tests

Friction and wear properties of high-quality lubricants were evaluated using a macroscale Nanovea tribometer in ball-on-disc test configuration. For tribological experiments, AISI 52100 steel ball of 12.7 mm diameter (surface roughness (Sa): 6-8 nm; Hardness: 60-62HRc) was pressed against a rotating disc of 50 mm diameter and 7 mm thickness (surface roughness (Sa): 7-8 nm; Hardness: 59-61HRc). Before the start of the tribological tests, both steel ball and disc test specimens were thoroughly cleaned using Stoddard solution, isopropanol, and acetone solvents in an ultrasonic bath for 10 minutes respectively. Tests were conducted at 100° C. and room temperature under 20N normal load, which created 1.1 GPa maximum Hertzian contact pressure. Steel disc was rotated at 1-3 m/s linear velocity (where wear track radius was varied from 8-10 mm) for 60 minutes. 5 μl of lubricant was introduced at the ball and flat point contact (sufficient to cover entire wear track) and boundary lubrication condition was maintained throughout the completion of the test.

Tests were repeated twice for all test lubricants to ensure reproducibility of the results. The instantaneous friction force generated between stationary ball and rotating disc was recorded in-situ during the test and later converted to the CoF for the entire test cycle. The wear scars developed on the ball and disc samples were characterized using optical 3D surface profilometry (Bruker Contour GT) and optical microscopy (Olympus STM6). The wear volume of the disc was difficult to calculate mathematically, as wear was manifested as mild scratches and material deposition. However, the volume loss of ball test specimens was assessed after the tribotests using following equation:

$$V = \left(\frac{\pi h}{x}\right)\left(\frac{3d^2}{4} + h^2\right)$$

where:

$$h = r - \sqrt{r^2 - \frac{d^2}{4}}$$

Line Contact Tribological Tests

The tribological performance of high-quality liquids was also assessed at linear sliding contacts using high-frequency reciprocating rig tribometer with a cylinder-on-flat configuration. AISI 52100 steel cylinder (4 mm×6 mm; surface roughness (Sa): 8-9 nm) and flat (12 mm×12 mm) test specimens with the same hardness of 58-60 HRc were used for these experiments. All test specimens were thoroughly cleaned with Stoddard solution, isopropanol, and acetone before the start of the test. 10 μl of test oil was introduced between the cylinder and flat contact. Tribological tests were performed by applying a normal load of 82N, which results in maximum Hertzian contact pressure of 530 MPa. A sliding stroke of 6 mm with a speed of 300 rpm was used and all tests were conducted at 100° C. for 60 minutes. Boundary lubrication regime was ensured under these test conditions by calculating fluid film thickness (using the Dowson-Higginson equation) and lambda value (using the ratio of fluid film thickness and surface roughness). Lambda value was less than unity and, thus, suggested operation of tribological tests under boundary lubrication. For each formulation, two runs were conducted under the same tribological conditions to ensure repeatability and reproducibility of the results. Co-efficient of friction results were acquired in-situ during the test at 5 Hz frequency using the DasyLab software. Wear scar developed on the cylinder was employed to assess wear performance using optical microscopy as shown in FIGS. 3A-3H. Initially, wear scar width was measured at nine locations by imaging the wear scar on the optical microscope and then an average of the wear scar width was used to calculate wear volume loss.

Results

Figure 2A:
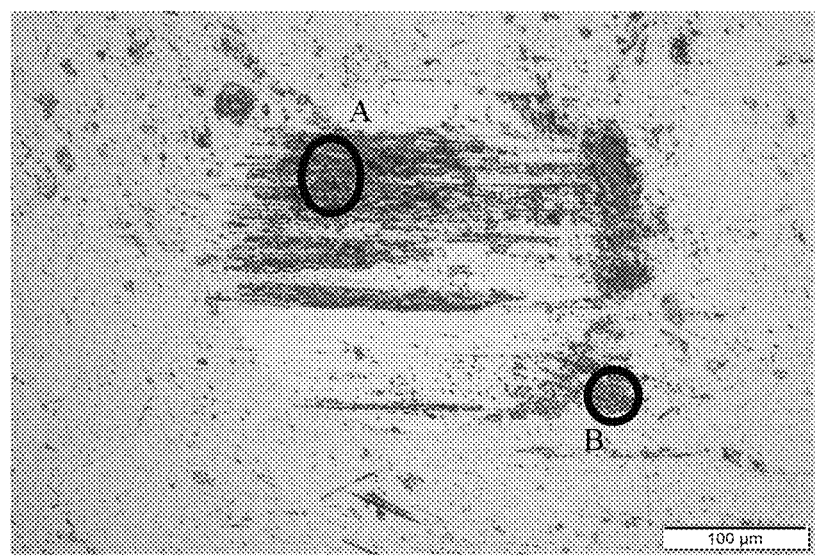
FIGS. 2A-2B illustrate the wear surface lubricated with a high quality liquid ("HQL") produced in accordance with one embodiment.
Figure 2B:
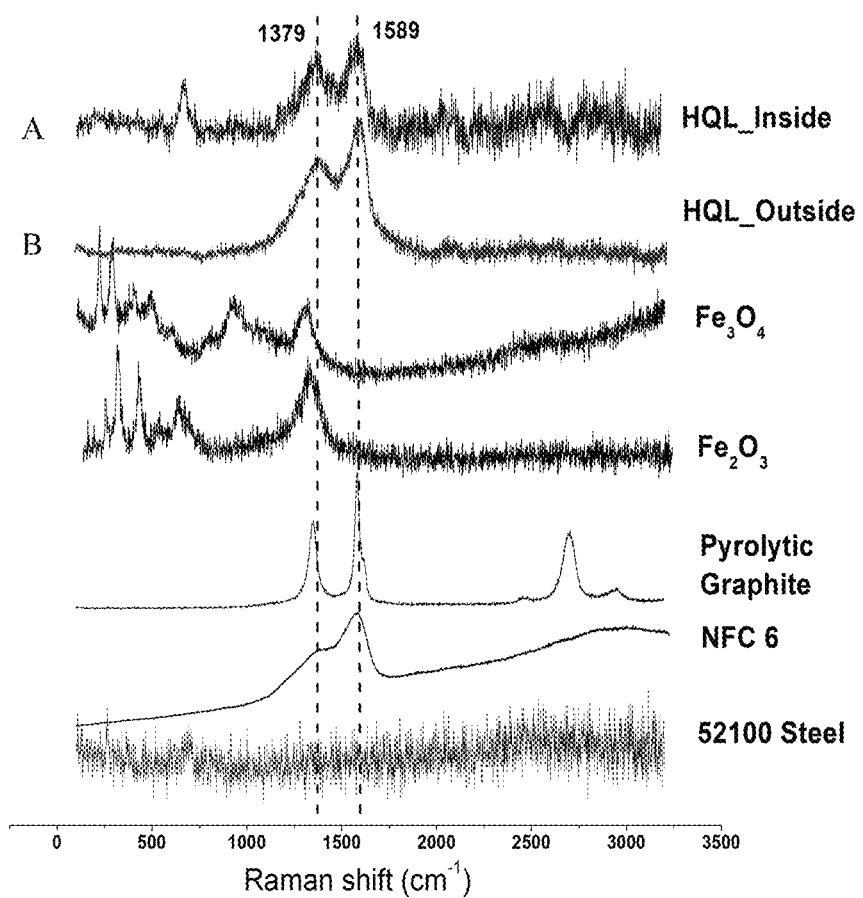
Figure 3A:
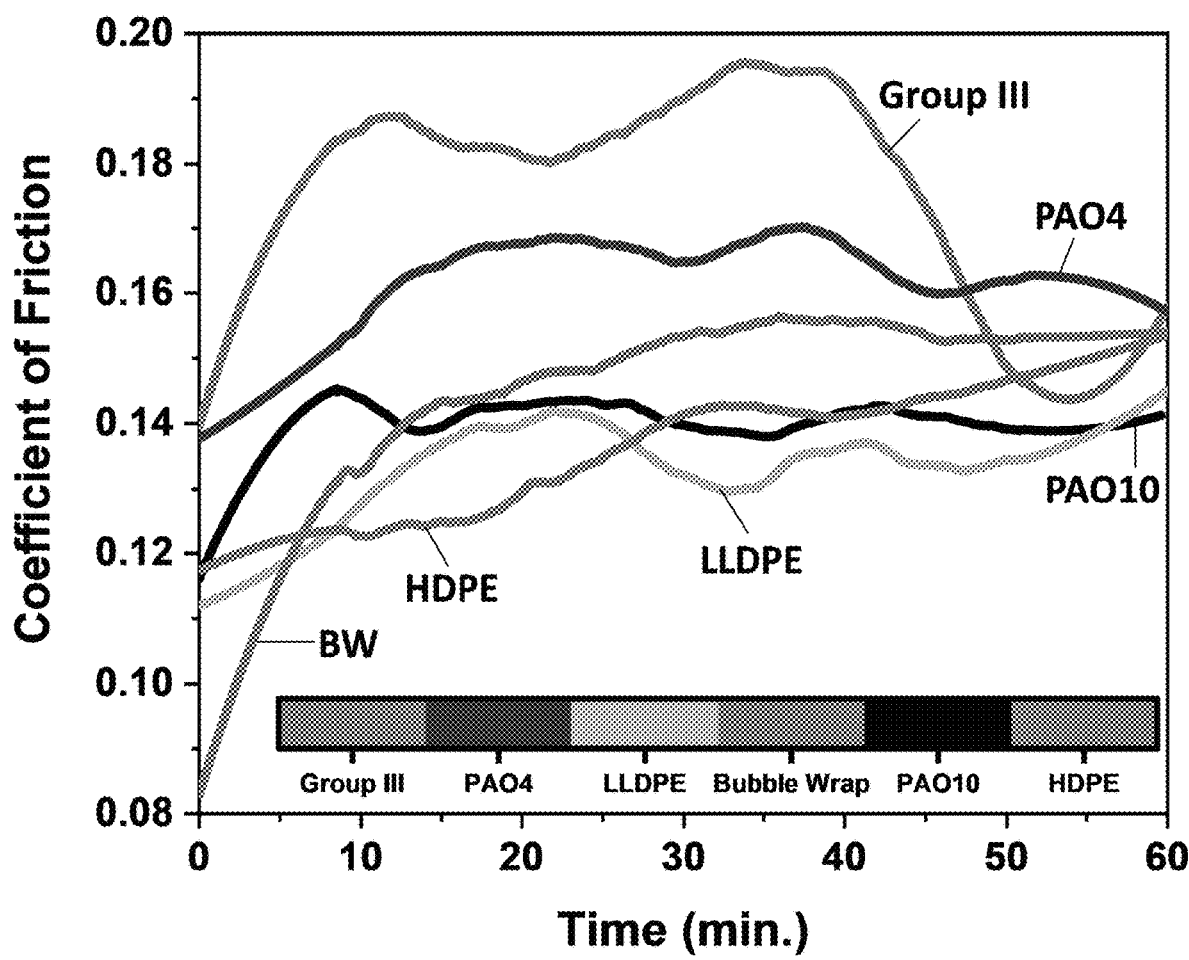
FIGS. 3A-3H show tribological performance of motor oils.
Figure 3B:
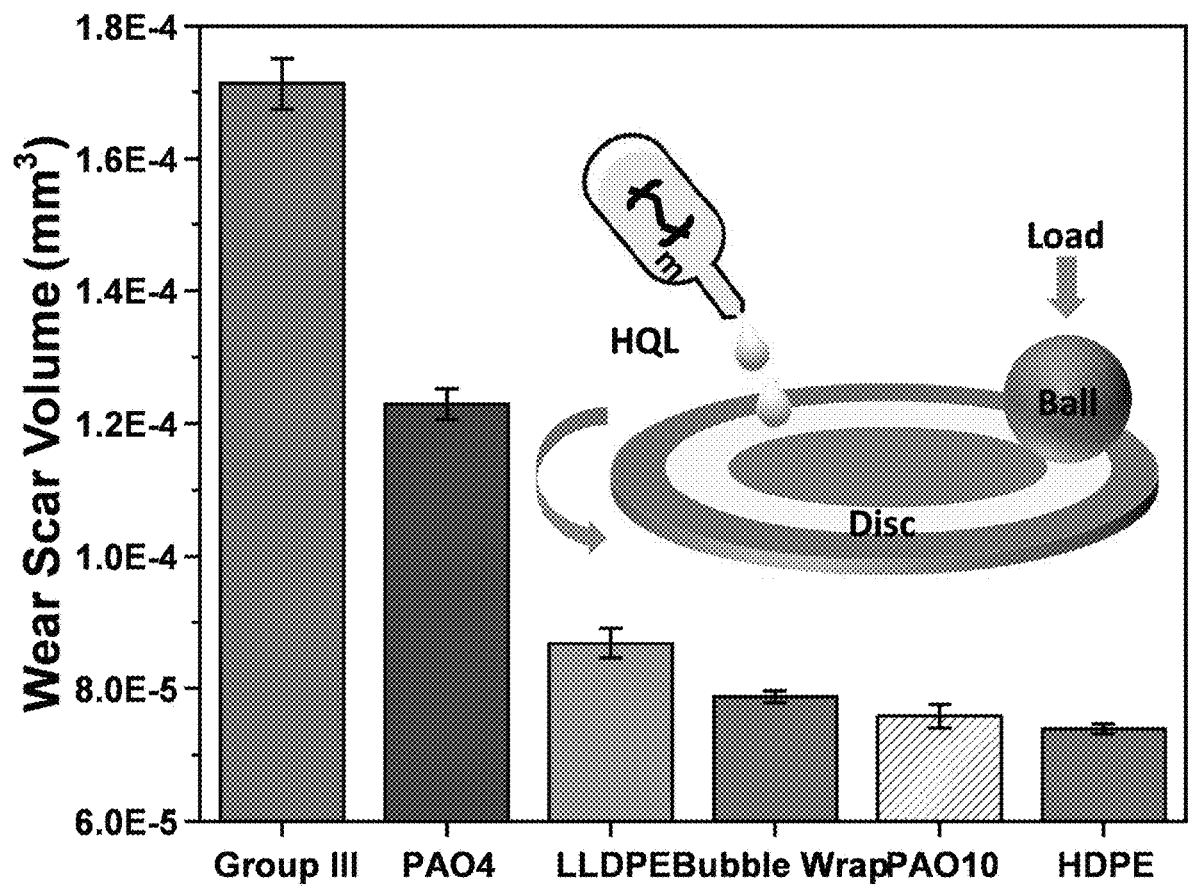
Figure 3C:
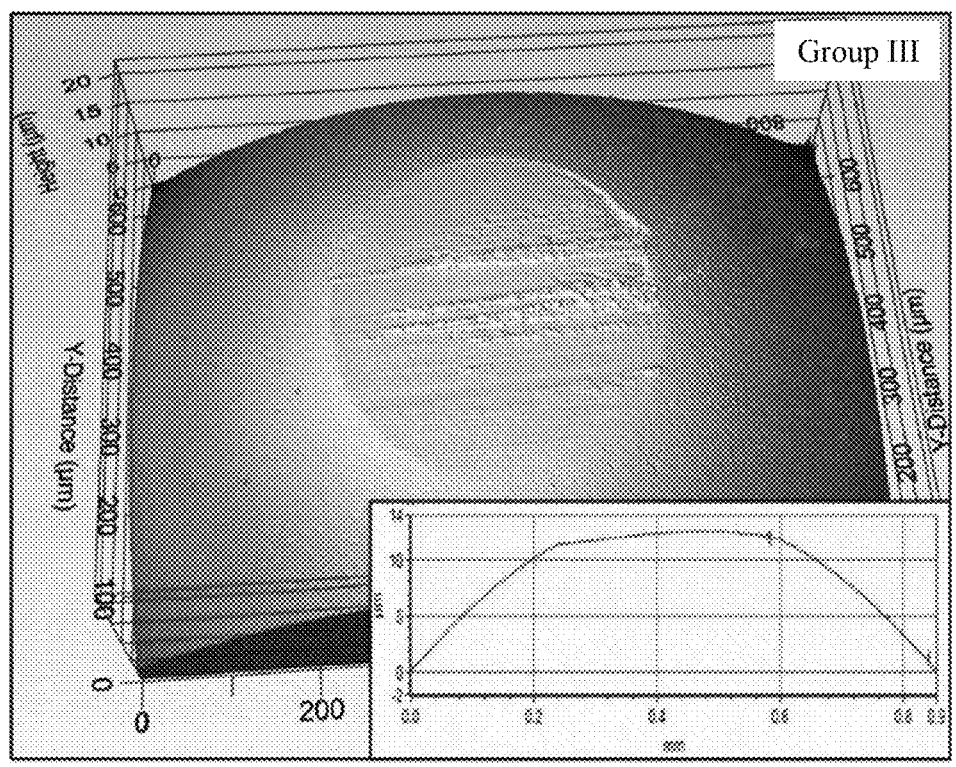
Figure 3D:
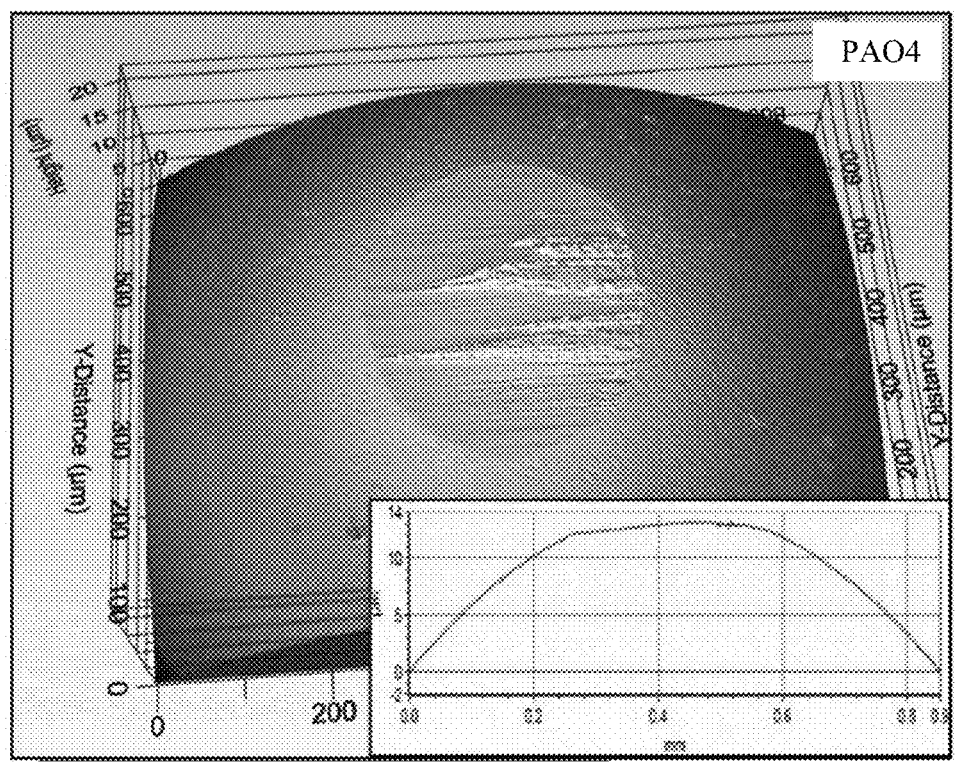
Figure 3E:
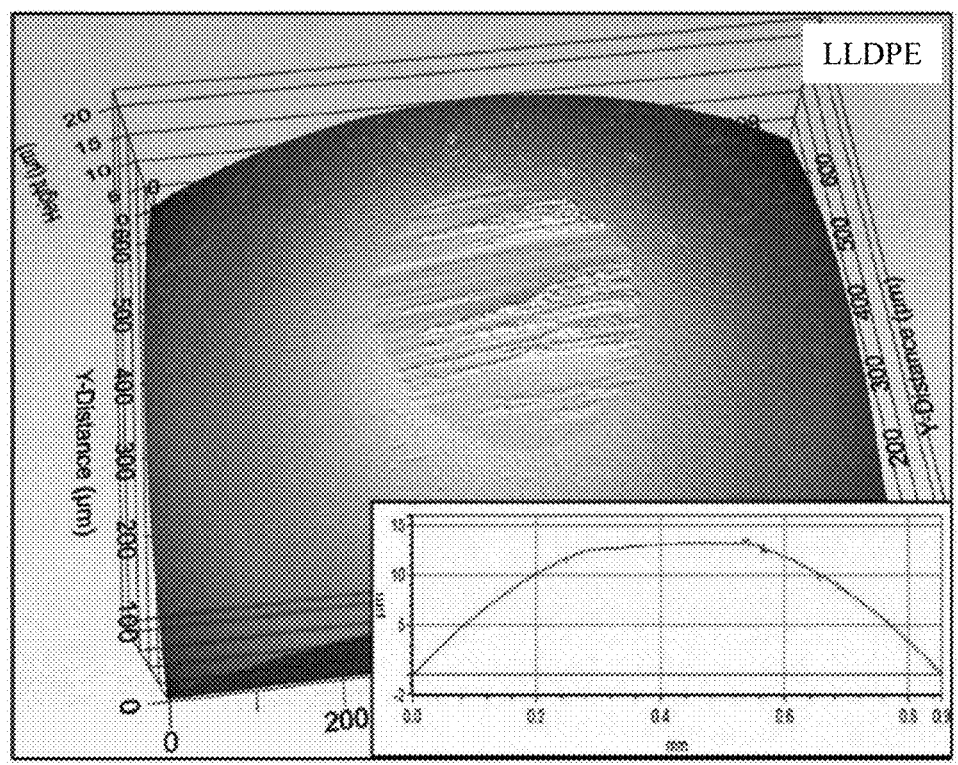
Figure 3F:
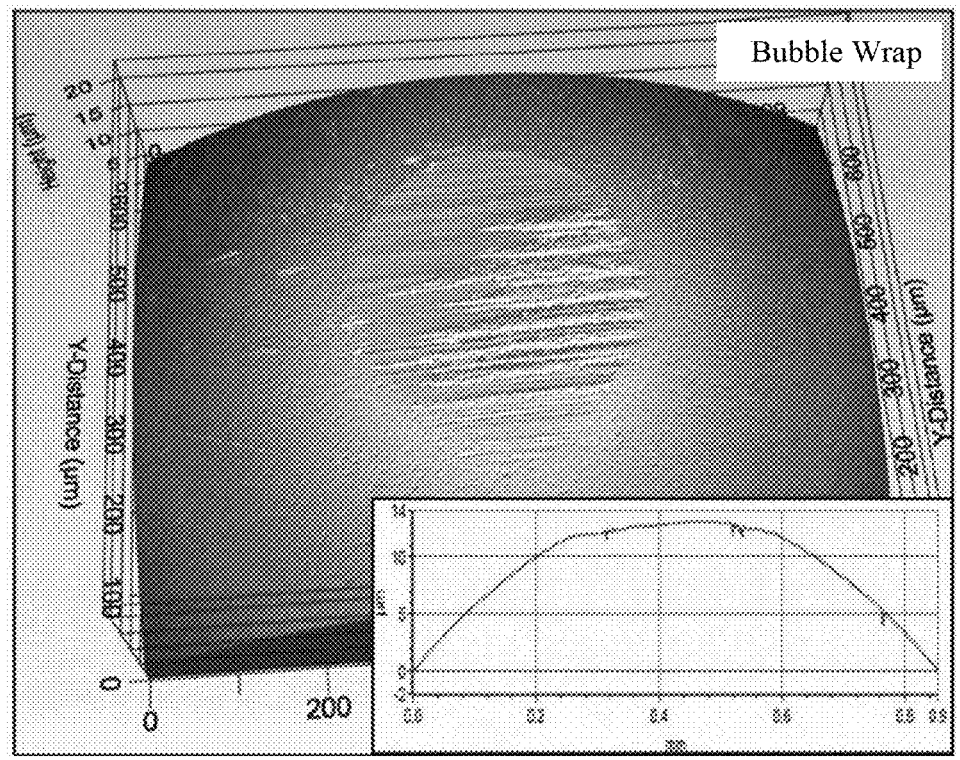
Figures 3G, 3H:
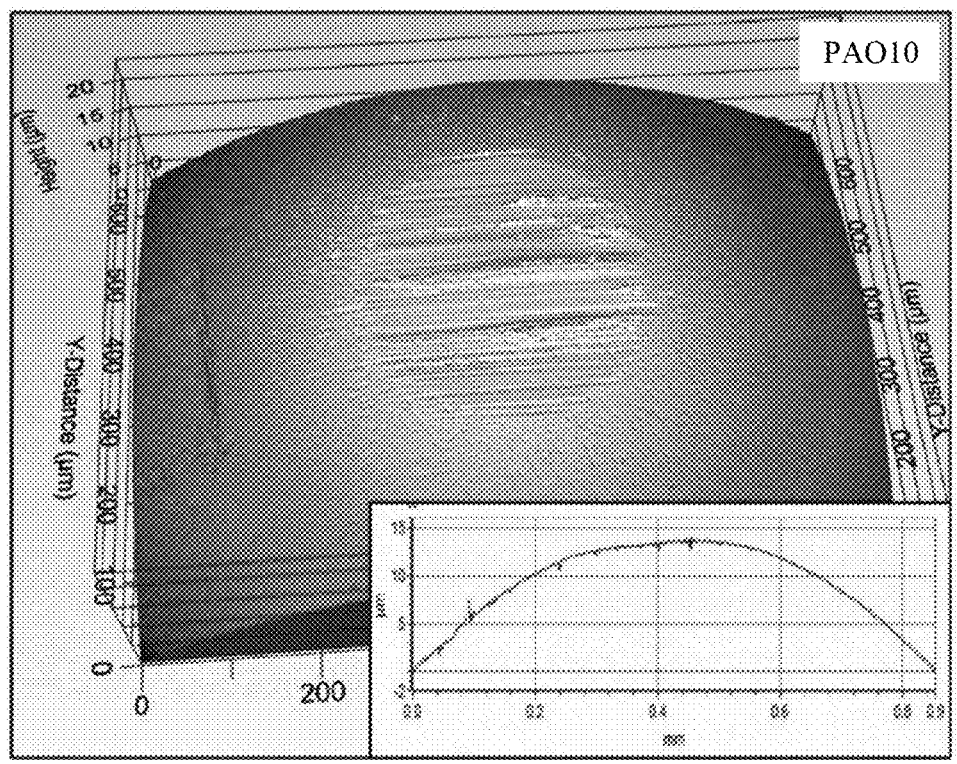
Figure 4A:
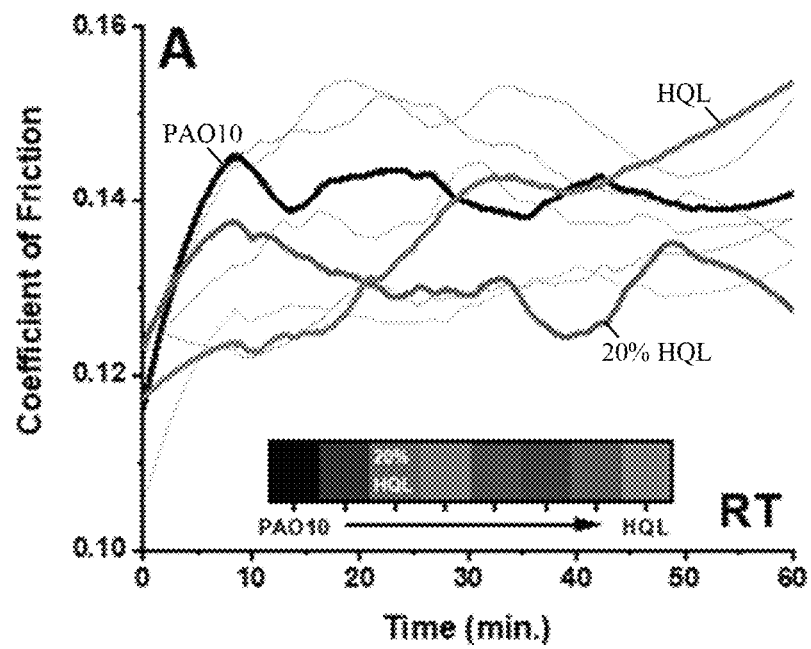
FIGS. 4A-4D show tribological performance of motor oils.
Figure 4B:
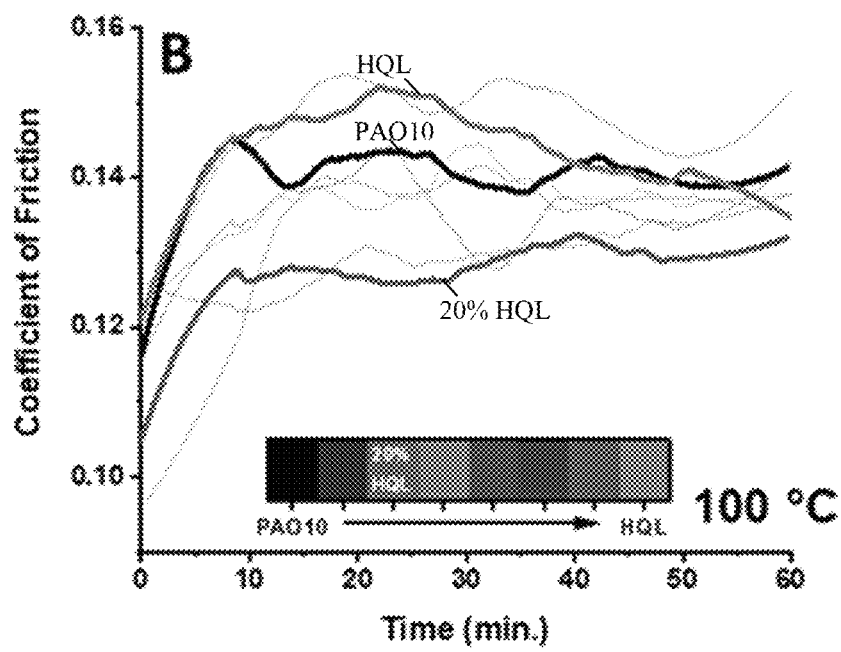
Figure 4C:
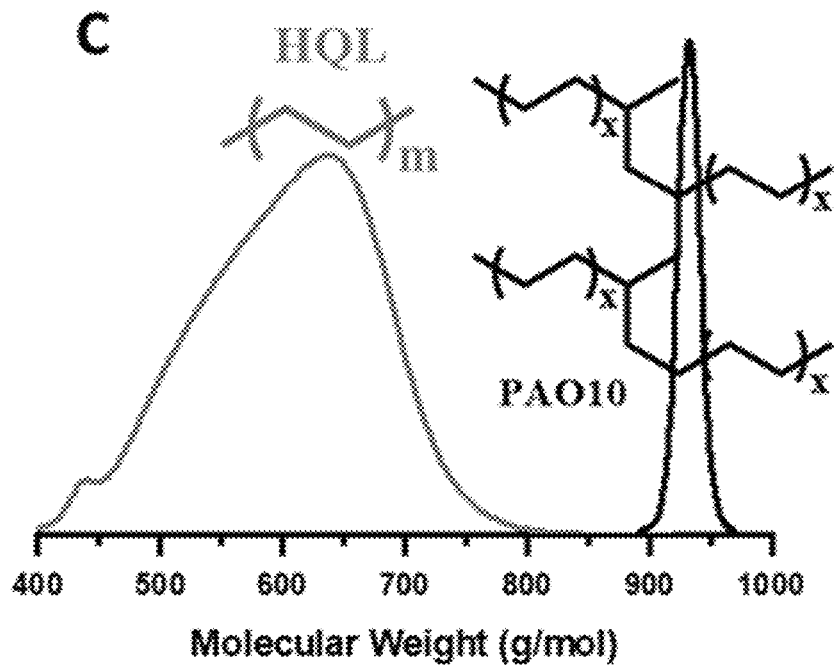
Figure 4D:
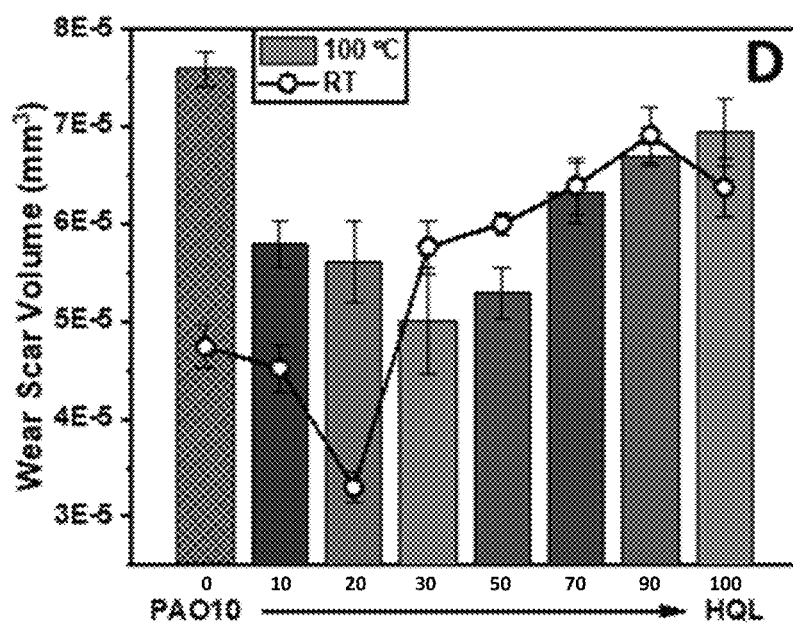
Figure 5A:
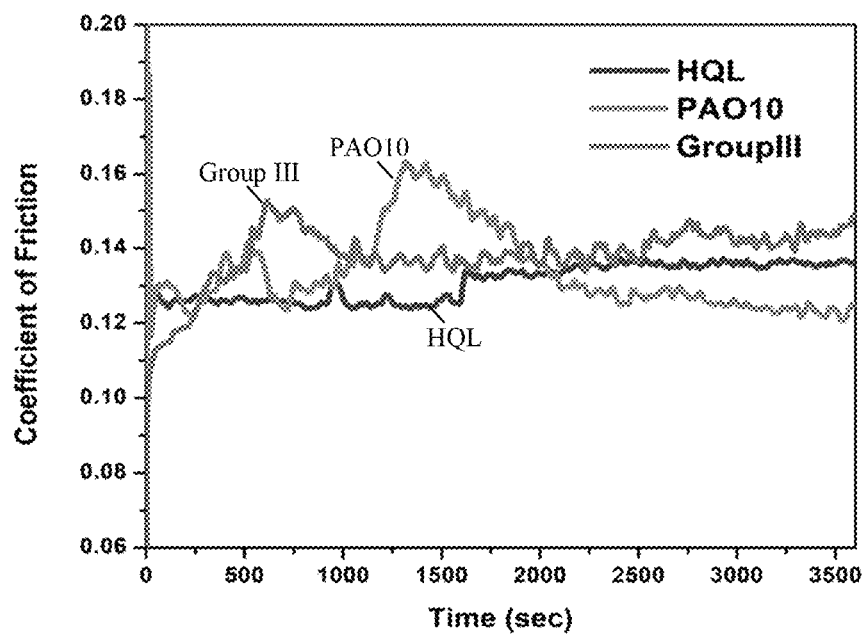
FIG. 5A is a graph of friction profiles for Group III mineral oil, PAO10, and HQL plotted as a function of time.
Figure 5B:
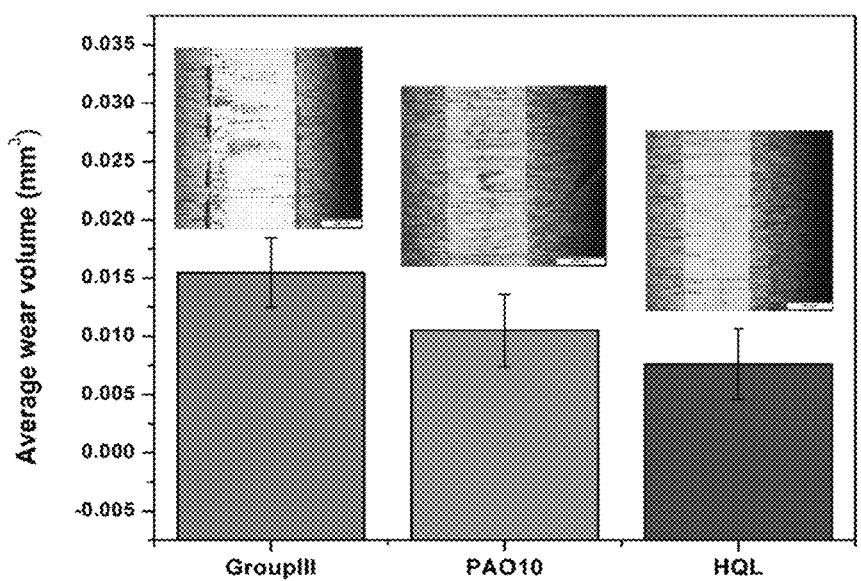
FIG. 5B is a graph showing a comparison of wear volume losses obtained from ball test specimens with optical micrographs exhibiting the condition and difference in wear scar size for three tests. The steel ball tested with HQL lubricant shows a much smaller wear scar than the steel ball tested in Group III and PAO10 oil.

FIG. 2B illustrates the observed Raman shift for a sliding surface shown in FIG. 2A. For the ball on disc test setup the following parameters were used: Temperature: 100° C.; Load: 20N; Hertzian contact Pressure: 1.1 Gpa; Ball and Disc Material: 52100 Steel; test time: 60 minutes. Peaks 1379 and 1589 in FIG. 2B correspond to graphitic D and G bands, respectively. The y-axis is for intensity (arbitrary units). HQL-based lubrication enables formation of carbonaceous tribofilms at the interface. The presence of carbon tribofilms in addition to fluid film effectively protects sliding surfaces against friction and wear.

Initial CoF measurements at 100° C. reveal comparable friction (CoF<0.15) between all HQLs and the synthetic lubricant PAO10 ($M_w$, $M_n$~930 Da, D=1.00). HDPE-derived HQL ($M_w$≈590, $M_n$≈580, D=1.02) performed slightly better than all other lubricants (CoF≈0.12) during early measurements at elevated temperatures. Other HQLs, such as LLDPE-derived HQL ($M_w$≈440, $M_n$≈430, D=1.01) and bubble wrap-derived HQL exhibited only slightly worse friction and wear. An initial increase in the CoF from bubble wrap derived HQL is suspected to be the result of a degradation in highly lubricating n-alkanes, leading to a more stable friction regime only after 10 minutes.

A significant amount of $Fe_2O_3$ particles accumulated by the end of the test in samples with higher friction due to abrasion events between the ball and the disc. These particles subsequently form a tribofilm with the remaining lubricant, leading to changes in the observed CoF by the end of the run. This explains the significant CoF decrease observed for Group III oil after 40 minutes.

WSV shows a clear delineation between cheaper industry lubricants and HQLs with a 43% reduction in wear between Group III and HDPE-derived HQL. Profilometry images show raised and asymmetric wear in Group III compared to HQLs, which coincides with a larger amount of $Fe_2O_3$ particles produced during the experiment.

Concentration studies were also undertaken to determine if any synergistic effects exist between a HQL and a synthetic oil. HDPE-derived HQL and PAO10 were chosen due to both liquids exhibiting excellent and near-equivalent wear and friction results at 100° C. HQL was added 0, 10, 20, 30, 50, 70, 90, and 100 wt % to PAO10 for friction and wear measurements at 25° C. and 100° C. Virgin HQL at 25° C. shows modest wear compared to virgin PAO10, with worsening friction as the test progresses. This suggests a lack of mobility and adhesion of HQL to the wear track to promote lubrication. Raising the temperature significantly improves friction by lowering the viscosity and preventing an initial buildup of $Fe_2O_3$ particles. This change in performance is likely dependent on the structural characteristics (e.g., degree of branching) of the resulting HQL, which can be modified by changing the hydrogenolysis conditions and/or the starting polymer. The degree of long-chain branching in PAO10, for example, is ~137 branches per 1000 carbon as determined by $^1H$ NMR, whereas HDPE- and LLDPE-derived HQLs sit at ~10 and ~181 per 1000 carbon, respectively. This would also suggest LLDPE HQL can perform comparably to PAO10 at room temperature whereas HDPE HQL cannot, even though both HQLs were produced equivalently.

Under both room temperature and 100° C. conditions, an optimum concentration of 20-30% HQL in PAO10 was found with respect to friction and wear. At 25° C., 30% HQL in PAO10 exhibited the imparted frictional stability of PAO10 as well as an overall decrease in friction by ~9% and wear by 30% when compared to virgin PAO10. A gradual CoF rise in pure HQL may be attributable to a degradation in smaller alkanes leading to the accumulation of wear debris. It is believed that a mixture mitigates debris formation while providing consistent superior lubrication from the low molecular weight alkanes.

At 100° C., a similar reduction is seen with 20% HQL in PAO10 yielding a ~9% decrease in friction and 34% decrease in wear compared to PAO10. The gradual CoF increase seen previously is absent at 100° C. when the HQL can immediately wet and adhere to the surface. Furthermore, the variability in the CoF for the optimum mixture is muted when compared to room temperature likely due to the heightened adhesion and mobility of the HQL at elevated temperatures.

Definitions

As used herein, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of producing a lubricant comprising:
    exposing, at a temperature of 150-350° C. and a pressure of 100-200 psi for 12-72 hours, a plurality of polymer molecules to a catalyst comprising a substrate having a plurality of catalytic nanoparticles deposited thereon;
    cleaving at least one carbon-carbon bond of a first polymer molecule of the plurality of polymer molecules;
    forming a plurality of hydrocarbon fragments from the cleaving;
    cleaving at least one carbon-carbon bond of a second polymer molecule of the plurality of polymer molecules; and
    forming a second plurality of hydrocarbon fragments.

2. The method of claim 1, wherein exposing the plurality of polymer molecules is for at least 24 hours.

3. The method of claim 1, wherein the plurality of catalytic nanoparticles comprise Pt or Ni.

4. The method of claim 1, wherein the plurality of polymer molecules are solvent-free.

5. The method of claim 1, wherein the plurality of polymer molecules have a number-average molecular weight ranging from 400-1000 Da.

6. The method of claim 1, wherein the plurality of hydrocarbon fragments are C30 to C76 alkanes.

7. The method of claim 6, wherein the plurality of hydrocarbon fragments have 10 branches per 1000 carbon to 400 branches per 1000 carbon.

8. A method of producing a lubricant comprising:
    exposing, at a temperature of 150-350° C. and a pressure of 100-200 psi for 12-72 hours, a plurality of polymer molecules to a catalyst comprising a substrate having a plurality of catalytic nanoparticles deposited thereon; and
    forming a plurality of hydrocarbon fragments from the plurality of polymer molecules by:
        cleaving at least one carbon-carbon bond of a first polymer molecule;

cleaving at least one carbon-carbon bond of a second polymer molecule; and mixing the plurality of hydrocarbon fragments with poly-α-olefin, wherein the mixture comprises 10-40 wt % of the plurality of hydrocarbon fragments and having a molar mass distribution of from 400 to 1000 Da and 90-60 wt % poly-α-olefin.

9. The method of claim 8, wherein the plurality of hydrocarbon fragments are C30 to C76 alkanes.

10. The method of claim 9, wherein the plurality of hydrocarbon fragments have 10 branches per 1000 carbon to 400 branches per 1000 carbon.

11. The method of claim 9, wherein the mixture comprises 20-30 wt % of the plurality of hydrocarbon fragments.

12. The method of claim 8, wherein mixing is at a temperature between 40° C. and 100° C.

13. The method of claim 8, wherein the plurality of hydrocarbon fragments are saturated hydrocarbons.

* * * * *